(12) United States Patent
Elliott et al.

(10) Patent No.: US 8,457,484 B2
(45) Date of Patent: Jun. 4, 2013

(54) APPARATUS, SYSTEMS AND METHODS FOR ACQUIRING INFORMATION FROM FILM SET DEVICES

(75) Inventors: David Elliott, San Jose, CA (US); Nicholas Newell, Highlands Ranch, CO (US); Mi Chen, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 37 days.

(21) Appl. No.: 13/115,886

(22) Filed: May 25, 2011

(65) Prior Publication Data

US 2012/0301127 A1   Nov. 29, 2012

(51) Int. Cl.
*G03B 17/24* (2006.01)
(52) U.S. Cl.
USPC .......................................... 396/310; 348/722
(58) Field of Classification Search
USPC .......................................... 396/310; 348/722
See application file for complete search history.

(56) References Cited

U.S. PATENT DOCUMENTS

| | | | | |
|---|---|---|---|---|
| 5,642,285 A * | 6/1997 | Woo et al. | ...................... | 701/470 |
| 6,829,612 B2 * | 12/2004 | Neulight | ........................ | 709/203 |
| 7,755,668 B1 * | 7/2010 | Johnston et al. | ............ | 348/211.4 |
| 7,836,127 B2 * | 11/2010 | Deane et al. | ................... | 709/204 |
| 8,161,504 B2 * | 4/2012 | Newell | ............... | 725/12 |
| 2007/0182864 A1 * | 8/2007 | Stoneham et al. | ............. | 348/722 |
| 2007/0253699 A1 * | 11/2007 | Yen et al. | ....................... | 396/311 |
| 2008/0092047 A1 * | 4/2008 | Fealkoff et al. | ................ | 715/716 |
| 2009/0290070 A1 * | 11/2009 | Duke et al. | ..................... | 348/722 |
| 2010/0030843 A1 * | 2/2010 | Fernandez | ...................... | 709/203 |
| 2011/0185019 A1 * | 7/2011 | Peters et al. | ................... | 709/203 |
| 2011/0249095 A1 * | 10/2011 | Kim et al. | ......................... | 348/46 |
| 2012/0044476 A1 * | 2/2012 | Earhart et al. | ................ | 356/4.01 |

\* cited by examiner

*Primary Examiner* — Christopher Mahoney
(74) *Attorney, Agent, or Firm* — Lowe Graham Jones PLLC

(57) ABSTRACT

Systems and methods are operable to acquire device information from film set devices used to film a media content event. An exemplary film production information acquisition device has at least a sensor device configured to sense an operation characteristic of a film set device, a film production information management system (IMS) communication interface configured to communicatively couple the film production information acquisition device to a film production information management system, and a processor system communicatively coupled to the film production IMS communication interface and the sensor device, and configured to process the sensed operation characteristic of the film set device into information that is communicated to the film production information management system.

22 Claims, 2 Drawing Sheets

APPARATUS, SYSTEMS AND METHODS FOR ACQUIRING INFORMATION FROM FILM SET DEVICES

BACKGROUND

Media devices, such as a set top box, a stereo, a television, a computer system, a game system, or the like, are often configured to receive and/or present media content events. A media content event may be communicated as part of a media content stream that comprises a video stream portion and an audio stream portion. Non-limiting examples of media content events include, but are not limited to, a television program, a newscast, a broadcast sports event, a movie, a game, or the like.

In some situations, the media content stream includes a metadata stream portion that comprises supplemental information of interest pertaining to the media content event. However, the amount of supplemental information is typically limited. And, the metadata stream portion is typically not separately received at the media device.

There are significant amounts of, and different types of, supplemental information pertaining to the filming and/or production of the media content event that may be of interest to certain users. The film set and/or film production information may pertain to camera types used to film the media content event, post processing techniques used to process the media content event, site location information, lighting sources and lighting styles used during filming of the media content event, costume and/or set designs used to stage the filming of the media content event, actor commentary, or the like. Other information may also be of interest.

However, acquiring the film set and/or film production information, and the subsequent post production processing of the acquired film set and/or film production information, is very difficult. Accordingly, there is a need in the arts to easily provide relatively large amounts of supplemental information pertaining to the filming and/or production of media content events.

SUMMARY

Systems and methods of acquiring device information from set devices used to film a media content event are disclosed. An exemplary film production information acquisition device has at least a sensor device configured to sense an operation characteristic of a film set device, a film production information management system (IMS) communication interface configured to communicatively couple the film production information acquisition device to a film production information management system, and a processor system communicatively coupled to the film production IMS communication interface and the sensor device, and configured to process the sensed operation characteristic of the film set device into information that is communicated to the film production information management system.

BRIEF DESCRIPTION OF THE DRAWINGS

Preferred and alternative embodiments are described in detail below with reference to the following drawings.

DETAILED DESCRIPTION

Figure 1:
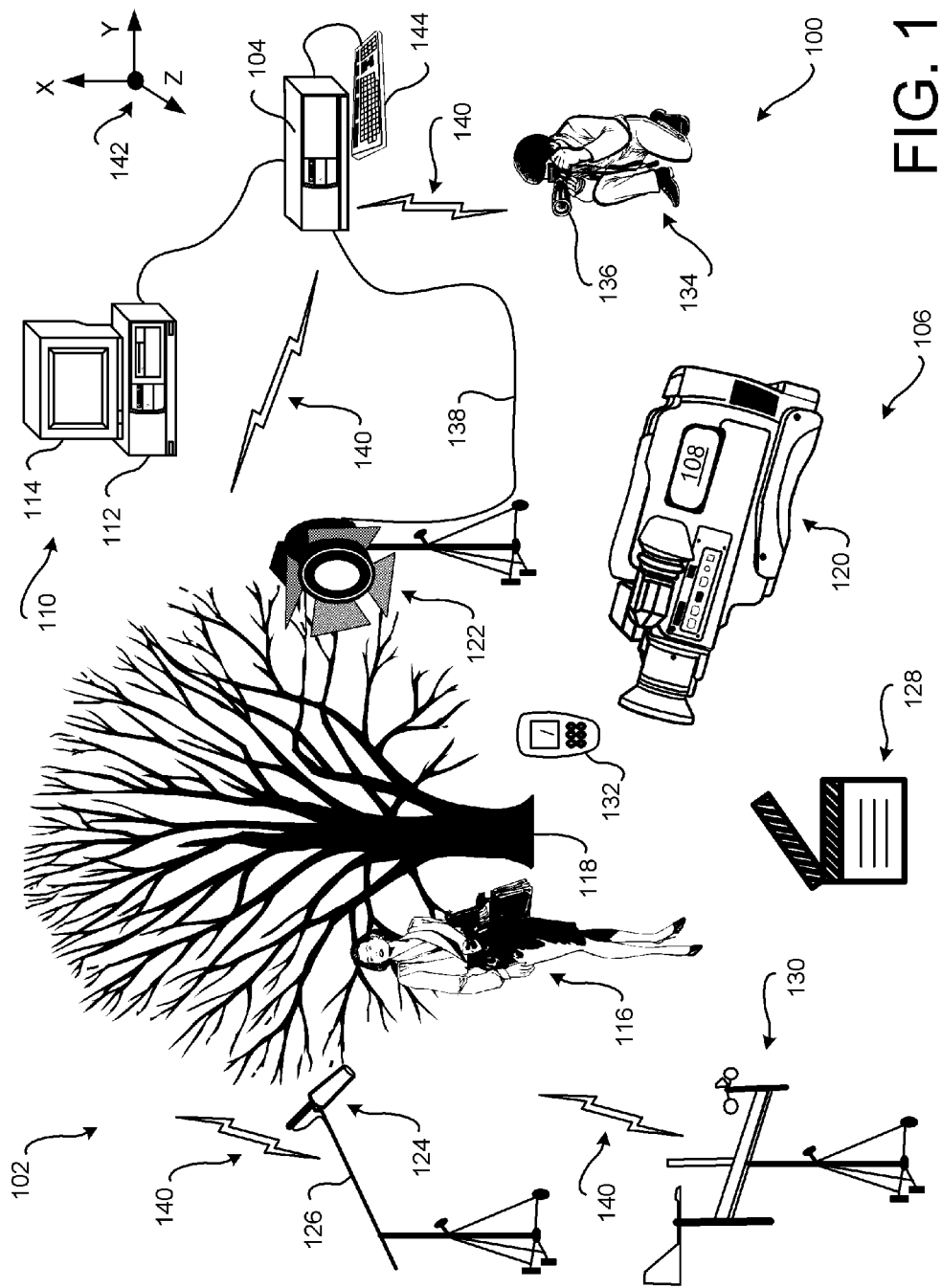
FIG. 1 is a perspective view of an exemplary embodiment of the film production information acquisition system operating at a conceptual production set environment.

FIG. 1 is a perspective view of an exemplary embodiment of the film production information acquisition system 100 operating at a conceptual film set environment 102. The film production information acquisition system 100 comprises a film production information management system 104 and a plurality of film set devices 106. Each of the film set devices 106 include a film production information acquisition device 108. The film production information acquisition devices 108 are configured to acquire information pertaining to its particular film set device 106, and are configured to communicate the acquired film production information to the film production information management system 104. The acquired device information comprises at least information about at least one operation characteristic of the film set device 106.

Exemplary film set devices 106 include cameras, lights, video and still image capture equipment, audio equipment, environmental devices, etc. Any device used at a film set may be provisioned with a film production information acquisition device 108 so that information pertaining to that particular film set device 106 may be acquired.

Film production information acquired by the film production information management system 104 is, at some point, provided to a post production system 110. An exemplary post production system 110 comprises a suitable computing device 112 that is configured to store and process the acquired film production information for incorporation into information metadata content that may be provided to a media device (not shown). Various user interfaces 114, such as a display, may be provided to assist in the processing of the acquired production information. The post production system 110 may be remote from the film set environment 102, and the acquired film production information may be processed after the filming of the media content event has been completed. In some embodiments, the film production information management system 104 and the post production system 110 may be integrated into a single device or system.

The production information metadata content may then be communicated to a media device for presentation to a user. The production information metadata content may present video information, still images, audio commentary and/or textual descriptions relating to the film set and/or film production processes. The media content event and the production information metadata content may be concurrently communicated to the media device. Alternatively, or additionally, the production information metadata content may be separately communicated to the media device.

At the receiving media device, a user of the production information metadata content may access information describing various film set and/or film production information, such as, but not limited to, the filming location and other information pertaining to the sets used for the various scenes of the media content event (set description and/or arrangement, equipment, filming techniques, GPS location coordinates, maps, filming date, time of day, weather conditions, season, etc.). Further, the production information metadata content may include additional information, such as post-production information that may include descriptions of special effects and/or computer graphics added to the media content event after filming, actor or director commentary, or the like. Thus, a user of the production information metadata content may learn about the filming of the media content event.

The exemplary film set environment 102 conceptually illustrates the filming of an actress 116 standing near a tree 118. The media content event is filmed using at least one video camera 120. To facilitate the filming process, other types of film set devices 106 are employed. For example, one or more stage lights 122 are used to provide set lighting. A microphone 124 is used to record the actress' voice and/or other sounds. The microphone 124 may be located in a desired position near the actress 116 by suitable manipulation of the boom 126. A clapperboard 128 may be used to facilitate the synchronizing of pictures and sounds, and/or to designate and mark particular filmed scenes. A weather station 130 may be used to track environmental conditions at the time of filming. A light meter 132 may be used to detect light at a particular location of the film set environment 102. In some instances, a photographer 134 may be capturing still images of the film set environment 102, actors, or other items of interest using a still camera 136. Other film set devices 106 of interest may also be used to acquire film production information. For example, but not limited to, dollies, cranes, tripods, set props, or the like may be configured to provide information to a film production information acquisition device 108 to acquire film production information related to that particular film set device 106.

The film production information acquisition device 108 may be affixed to an external surface of the film set device 106. Some embodiments include sensors that acquire information related to the use of the film set device 106. Alternatively, or additionally, embodiments of the film production information acquisition device 108 may be communicatively coupled to its respective film set device 106 so as to electronically receive supplemental information from the film set device 106. For example, the film production information acquisition device 108 is illustrated as affixed to the outside surface of the video camera 120. Accordingly, film production information may be acquired using a legacy video camera 120.

In some embodiments, the film production information acquisition device 108 is an integrated component of the film set device 106. For example, but not limited to, some video cameras 120 are very sophisticated electronic devices, and include their own data sensors and processing systems. In addition to capturing video images, such internal processing systems may also be configured to acquire film production information. Accordingly, the film production information acquisition device 108 may be configured as an integrated device or system of the video camera 120. In some embodiments, the film production information acquisition device 108 may be implemented as logic within video camera 120 or another of the film set devices 106.

The various film production information acquisition devices 108 are configured to communicate the acquired device information to the film production information management system 104 using any suitable communication medium. The acquired device information comprises information about one or more operation characteristics of the film set device 106. In an exemplary embodiment, one or more of the film production information acquisition devices 108 may use a wire-based medium to communicate with the film production information management system 104. For example, the film production information acquisition device 108 associated with the exemplary stage light 122 may be communicatively coupled to the film production information management system 104 using the wire connector 138.

Alternatively, or additionally, one or more of the film production information acquisition devices 108 may be communicatively coupled to the film production information management system 104 using a suitable wireless signal 140, such as a radio signal, that is detectable by the film production information management system 104.

Alternatively, or additionally, one or more of the film production information acquisition devices 108 may be configured to store the acquired information on a memory medium. The acquired information is then later downloaded to the film production information management system 104 and/or the post production system 110. In some embodiments, the memory medium may be a portable medium such that a corresponding memory reading device at the film production information management system 104 and/or the post production system 110 may retrieve the acquired information from the portable memory medium.

In the various embodiments, some or all of the information from a plurality of film production information acquisition devices 108 are time synchronized with each other. That is, information that is acquired by a film production information acquisition device 108 may be time referenced with information acquired by other film production information acquisition devices 108. In such embodiments, one or more of the film set devices 106 and/or the film production information management system 104 have clocks or other timing devices that provide time stamp information or the like that may be used for time synchronization when the information is processed at the post production system 110.

For example, the acquired luminosity output of the stage light 122 with respect to the time of recorded readings from the light meter may be used to determine various luminosity information associated with a particular scene or the like that may be of interest to the user of the production information metadata. As another example, the time information pertaining to environmental conditions and the information pertaining to the lens of the video camera 120 may be used to determine various image capture and weather impact type information that may be of interest.

Additionally, or alternatively, acquired information from the film production information acquisition devices 108 may be location synchronized. That is, information that is acquired by the various different film production information acquisition devices 108 may be spatially referenced with other information. In such embodiments, one or more of the film set devices 106 and/or the film production information management system 104 have location determination devices that are used to provide location information that may be used for location (spatial) synchronization when the acquired information is processed at the post production system 110.

In some embodiments, an earth-based coordinate system (latitude/longitude) may be used to spatially coordinate location of the various film set devices 106. Additionally, or alternatively, an arbitrary reference point 142 may be defined at some location within the film set environment. Any suitable referencing system may be used, such as a Cartesian coordinate system, a polar reference system, or the like. The location of the film set devices 106 and/or the film production information management system 104 may then be referenced with each other.

The location information may then be used to determine various spatial associations between the film set and/or film production information. For example, the acquired location of the stage light 122 with respect to the acquired location of the light meter may be used to determine various luminosity information that may be of interest to the user of the production information metadata. As another example, the relative locations of the microphone 125 and the video camera 120 may be used to determine various acoustic type information that may be of interest.

An exemplary film set device 106 includes the exemplary video camera 120. A single video camera 120 is illustrated. However, any number of video cameras 120 with their own film production information acquisition device 108 may be deployed about the film set environment 102 during the filming of the media content event.

Any information of interest about the video camera 120, and/or the components thereof, may be acquired by the various embodiments. Exemplary operation characteristic information about the video camera 120 may include, but is not limited to, the make and/or model of the video camera 120, manufacturer of the video camera 120, type of lens used for filming by the video camera 120, type of film and/or memory used in the video camera 120, type of filters over the lens of the video camera 120, or the like. Other information pertaining to the operation characteristics of the video camera 120 may be acquired. For example, but not limited to, lens settings, focus settings, aperture settings, image capture speeds may be acquired. Other exemplary information may include the orientation and/or location of the video camera 120, direction and/or speed of movement of the video camera 120 during filming, or the like. Some embodiments of the film production information acquisition device 108, or event the video camera 120 itself, may include devices that are able to detect and/or determine the distance from the video camera 120 to the filmed subject, such as the example actress 116.

Another exemplary film set device 106 includes the stage light 122. A single stage light 122 is illustrated. However, any number of stage lights 122 with their own film production information acquisition device 108 may deployed about the film set environment 102. Any suitable operation characteristic information pertaining to a particular stage light 122 may be acquired by the various embodiments. For example, information about the stage light 122 may include, but is not limited to, make, model, manufacturer, type of lens, type and/or color of filters, light reflecting devices, or the like. Information pertaining to the operation characteristics of the stage light 122 may include, but is not limited to, light luminosity output, light color, light temperature, light dispersion, light spot size, or the like. Information pertaining to the location, orientation, and/or direction of the stage light 122 within the film set environment 102, the relative location of the stage light 122, and/or the distance to from stage light 122 to the filmed subject, may also be acquired.

Another exemplary film set device 106 includes the microphone 124. A single microphone 124 is illustrated. However, any number of microphones 124 with their own film production information acquisition device 108 may be deployed about the film set environment 102. Any suitable operation characteristic information pertaining to a particular microphone 124 may be acquired by the various embodiments. For example, information about the microphone 124 may include, but is not limited to, make and/or model of the microphone 124, manufacturer of the microphone 124, type of cover filters, filters, or blimps used on the microphone 124, or the like. Information pertaining to the operation characteristics of the microphone 124 may include, but is not limited to, sensitivity settings, type of polar pattern and/or directionality of the microphone 124, calibration information, or the like. Information operation characteristics pertaining to the location, orientation and/or direction of the microphone 124 and/or its boom 126 within the film set environment 102, the relative location of the microphone 124 and/or its boom 126 within the film set environment 102, or the distance to from microphone 124 and/or its boom 126 to the filmed subject or another film set device 106, may also be acquired.

Another exemplary film set device 106 includes the clapperboard 128. The film production information acquisition device 108 associated with the clapperboard 128 may be providing time (temporal) synchronization and/or scene description type information to the film production information management system 104. Any suitable operation characteristic information pertaining to the operation characteristics of clapperboard 128 may be acquired by the various embodiments. For example, information about the clapperboard 128 may include, but is not limited to, make, model, manufacturer, or the like. Information captured electronically by the clapperboard 128 may also be acquired.

Another exemplary film set device 106 includes the weather station 130, which may include one or more environment (i.e., weather) sensing devices therein that are configured to acquire environment type information. Any suitable environmental type information (operation characteristics) may be acquired by the various embodiments. For example, the film production information acquisition device 108 associated with the weather station 130 may provide temperature information acquired by a thermometer, wind speed information acquired by an anemometer, wind speed direction information acquired by a wind vane or sock, humidity information acquired by a barometer, precipitation information acquired by a rain gauge device, altitude information acquired by an altimeter, or ambient lighting information acquired by a light sensor, or the like. Information pertaining to the location of the weather station 130 and/or the time of data acquisition may also be included by the various embodiments.

Another exemplary film set device 106 includes the light meter 132 that acquires light level and other light type information at a particular location within the film set environment 102. The film production information acquisition device 108 associated with the exemplary light meter 132 may be providing lighting information to the film production information management system 104. Operation characteristic information about the light meter 132 may include, but is not limited to, make, model, manufacturer, or the like. Information pertaining to the operation characteristics of the light meter 132 may include, but is not limited to, light sensitivity settings, light level detection information, or the like. Information pertaining to the location of the light meter 132 within the film set environment 102, its location to the filmed subject, and/or its orientation may also be included.

Another exemplary film set device 106 includes the still camera 136. The photographer 134 is illustrated as capturing still images using the still camera 136. Any suitable information pertaining to a particular still camera 136 may be acquired by the various embodiments. Exemplary operation characteristic information about the still camera 136 may include, but is not limited to, make and/or model of the still camera 136, manufacturer of the still camera 136, type of lens used on the still camera 136, type of film and/or memory used by the still camera 136, type of filters on the lens of the still camera 136, or the like. Other information pertaining to the operation characteristics of the still camera 136 may be acquired. For example, but not limited to, lens settings, focus settings, aperture settings, image capture speeds may be acquired by the various embodiments. Other exemplary information may include the orientation and/or location of the still camera 136, direction and/or speed of movement of the still camera 136 during filming, or the like. Some embodiments of the film production information acquisition device 108, or even the still camera 136 itself, may include devices that are able to detect and/or determine the distance from the still camera 136 to the filmed subject, such as the actress 116.

Some embodiments of the film production information management system 104 may include, or may be configured to communicatively couple to, one or more user interfaces. For example, but not limited to, an exemplary keyboard 144 is coupled to the film production information management system 104 so that an operator or technician can configure and/or operate the film production information management system 104. Some user interfaces may be configured to facilitate management of and/or storage of information acquired by the plurality of film production information acquisition devices 108.

Figure 2:
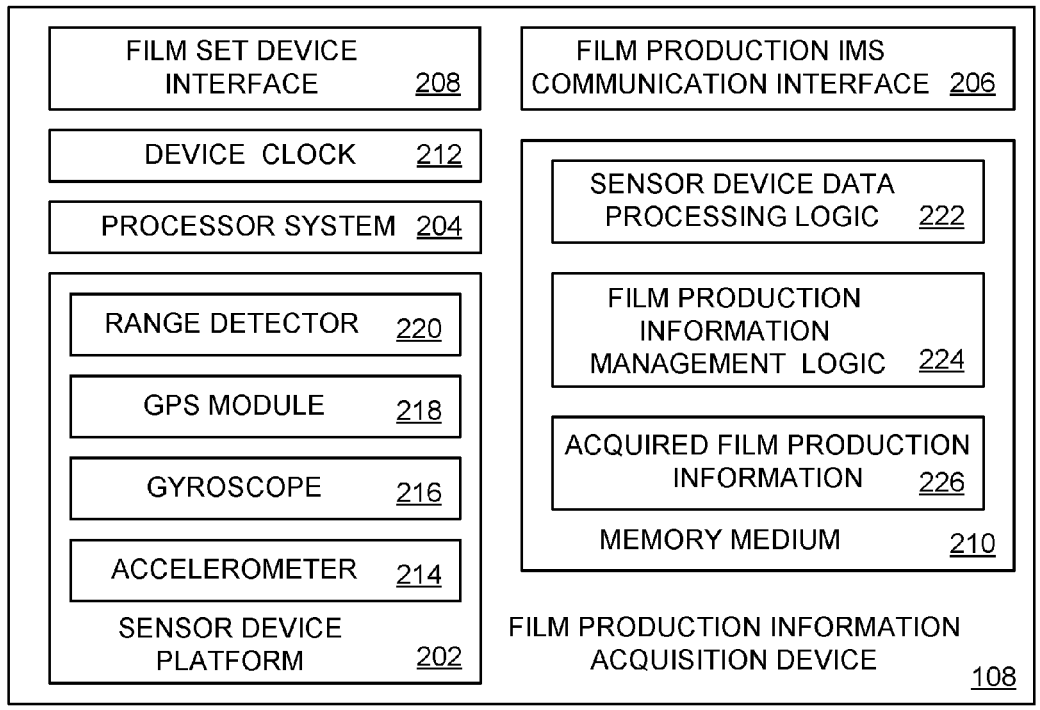
FIG. 2 is a block diagram of an exemplary film production information acquisition device.

FIG. 2 is a block diagram of an exemplary film production information acquisition device 108. The exemplary film production information acquisition device 108 comprises an optional sensor device platform 202, a processor system 204, an optional film production information management system (IMS) communication interface 206, an optional film set device interface 208, a memory medium 210, and an optional device clock 212 which may be communicatively coupled together. The exemplary sensor device platform 202 comprises at least one sensor device that is configured to sense an operation characteristic of its respective film set device 106. Exemplary sensor devices that acquire operation characteristic information include, but are not limited to, an accelerometer 214, a gyroscope 216, a global positioning system (GPS) module 218, and/or a range detector 220. The memory medium 210 comprises portions for storing the sensor device data processing logic 222, the film production information management logic 224, and an optional portion to store the acquired film production information 226. In some embodiments, the sensor device data processing logic 222 and the film production information management logic 224 may be integrated together, and/or may be integrated with other logic. In some embodiments, the portion storing the acquired film production information 226 may be separately removable and portable. In other embodiments, some or all of these memory and other data manipulation functions may be provided by and using remote server or other electronic devices suitably connected via the Internet or otherwise to a client device. Other media devices may include some, or may omit some, of the above-described components. Further, additional components not described herein may be included in alternative embodiments.

The exemplary film production information acquisition device 108 may be a stand-alone device that is configured to physically coupled to and/or to communicatively couple to a selected film set device 106. Some embodiments may be configured to receive supplemental information that is acquired by its associated film set device 106. The film set device interface 208 is configured to communicatively couple to its respective film set device 102 so that the acquired supplemental device information may be received from the film set device 106.

In embodiments that are integrated with the film set device 106, the components may be configured to perform other functions and/or tasks. For example, but not limited to, a film production information acquisition device 108 may be integrated into a video camera 120 or a still camera 136. In addition to acquiring information that is used by embodiments of the film production information acquisition system 100, the processor system 204 may also manage various image capture functions, such as automatic lens focus control, automatic aperture control, image storage management, or the like.

The processor system 204, under management of the sensor device data processing logic 222, is configured to process information received from active sensor devices residing in the sensor device platform 202. The received information from the sensor devices may be processed into information that is then communicated to the film production information management system 104. Alternatively, or additionally, the sensor information may be communicated with no processing, or relatively little processing, to the film production information management system 104.

The processor system 204, under management of the film production information management logic 224, is configured to communicate the acquired information to the film production information management system 104, via the film production IMS communication interface 206 which is communicatively coupled to the film production information management system 104. Accordingly, the film production information management logic 224 may be configured to facilitate processing of the acquired sensor information into a format that is used for communication by the film production IMS communication interface 206. If the acquired sensor information is saved into the acquired film production information 226 portion of the memory medium 210, the film production information management logic 224 may be configured to facilitate and manage the data storing and/or data retrieval operations.

The exemplary sensor device platform 202 may include the accelerometer 214, configured to detect an acceleration movement, and/or the gyroscope 216, configured to detect a rotation movement. The processor system 204, under management of the sensor device data processing logic 222, is configured to determine orientation information based on the sensed movement by the accelerometer 214 and/or the gyroscope 216. The detected rotational movement and the detected acceleration movement are configured to permit determination of the orientation of the film set device 106. Further, if the reference location 142 is known, an initial location of the film production information acquisition device 108 is known, and subsequent movement is tracked, the processor system 204 may be configured to determine location information of the film production information acquisition device 108. The accelerometer 214 and/or the gyroscope 216 may be implemented using micro-electro-mechanical systems (MEMS) technologies. Any suitable navigation type device or system may be used by the various embodiments of the film production information acquisition device 108. In some embodiments, the accelerometer 214 and the gyroscope 216 are part of an external device that is communicatively coupled to the film production information acquisition device 108.

The exemplary sensor device platform 202 may include the GPS module 218 configured to detect an earth-based location. Any suitable GPS device or system may be used by the various embodiments of the film production information acquisition device 108. In some embodiments, the GPS module 218 is an external device that is communicatively coupled to the film production information acquisition device 108.

The exemplary sensor device platform 202 may include the range detector 220 configured to detect a range (distance) from a detected object. An exemplary range detector 220 may employ, but is not limited to, ultrasonic or infrared technologies. Any suitable range detector 220 or range finder system may be used by the various embodiments of the film production information acquisition device 108. In some embodiments, the range detector 220 is an external device that is communicatively coupled to the film production information acquisition device 108. Based upon the location of the range detector 220 to its film set device 106, a suitable translation process may be used to determine the distance between the film set device 106 and an object detected by the range detector 220.

In some embodiments, the sensor devices of the sensor device platform 202 may be omitted and/or other types of sensor devices may be added depending upon the nature and/or characteristic of the information that is to be acquired by the film production information acquisition device 108. Some embodiments may omit the sensor device platform 202 (and the sensing devices therein) so as to be configured to receive and communicate electronic information that is generated by its associated film set device 106.

In some embodiments, selected ones of the sensor devices may be operational (active), while other sensor devices may be configured to be inoperative (inactive). In such embodiments, a "universal" film production information acquisition device 108 may be coupled or attached to any film set device 106 of interest, and information may be selectively acquired from the film production information acquisition device 108 based upon selected activation or deactivation of the sensor devices therein.

The exemplary sensor device platform 202 may include the example device clock 212 that is configured to provide time information. The time information, or time stamp, may be included with the sensor device information for time synchronization with information acquired by other ones of the film production information acquisition devices 108. The time information may be added when the sensor device information is saved into the acquired film production information 226, and/or may be included when the sensor device information is communicated to the film production information management system 104.

Embodiments of the film production IMS communication interface 206 are configured to communicate acquired information to the film production information management system 104. An exemplary film production IMS communication interface 206 comprises a wireless transceiver configured to transmit, and/or to receive, the exemplary wireless signals 140. Alternatively, or additionally, the film production IMS communication interface 206 may comprise a suitable wire connection device that is configured to communicatively and physically couple to the exemplary wire connector 138. Alternatively, or additionally, the film production IMS communication interface 206 may comprise a suitable memory medium connection device that is configured to communicatively and physically couple a portable memory medium to the film production information acquisition device 108.

Figure 3:
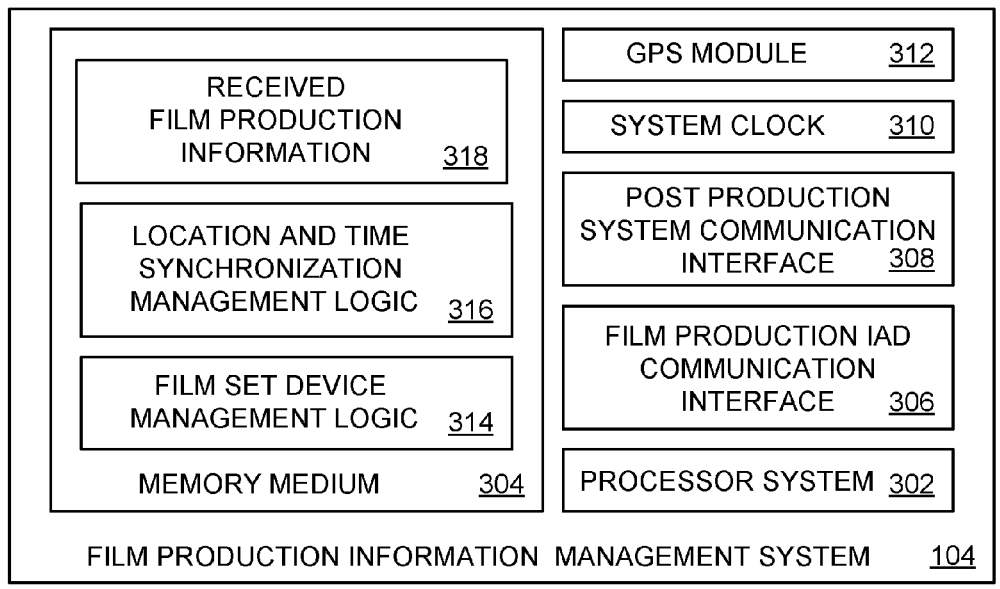
FIG. 3 is a block diagram of an example embodiment of a film production information management system.

FIG. 3 is a block diagram of an example embodiment of a film production information management system 104. The exemplary film production information management system 104 comprises a processor system 302, a memory medium 304, an optional film production information acquisition device (IAD) communication interface 306, a post production system communication interface 308, an optional system clock 310, and an optional GPS module 312 which may be communicatively coupled together. The memory medium 304 comprises portions for storing the film set device management logic 314, the location and time synchronization management logic 316, and an optional portion to store the received film production information 318. In some embodiments, the film set device management logic 314 and the location and time synchronization management logic 316 may be integrated together, and/or may be integrated with other logic. In some embodiments, the portion storing the received film production information 318 may be separately removable and portable. In other embodiments, some or all of these memory and other data manipulation functions may be provided by and using remote server or other electronic devices suitably connected via the Internet or otherwise to a client device. Other media devices may include some, or may omit some, of the above-described components. Further, additional components not described herein may be included in alternative embodiments.

In an exemplary embodiment, the film production information management system 104 is a portable device that it can be located at, or located in proximity to, the location of the film set environment 102. Alternatively, the film production information management system 104 may be remote from the location of the film set environment 102. The acquired information from the plurality of film production information acquisition devices 108 may be communicated using any suitable communication technology. Accordingly, a single film production information management system 104 may be used to acquire and process information from different film set environments 102, and even from concurrently filmed different media content events.

The exemplary system clock 310 is configured to provide time information. The time information, embodied as a time stamp or the like, may be included with the acquired information received from the film production information acquisition devices 108 for time synchronization. The time information may be added when the acquired information is saved into the received film production information 318, and/or may be included when the acquired information is communicated to the post production system 110.

The exemplary GPS module 312 is configured to detect an earth-based location of the film production information management system 104. Any suitable GPS device or system may be used by the various embodiments of the film production information acquisition device 108. In some embodiments, the GPS module 312 is an external device that is communicatively coupled to the film production information acquisition device 108.

The processor system 302, under management of the film set device management logic 314, is configured to manage the acquired information received from the film production information acquisition devices 108. The received information may be further processed into a desired from, associated with acquired information received from other film production information acquisition devices 108, and/or may be saved into the received film production information 318 portion of the memory medium 304. In some embodiments, the time information from the system clock 310 is communicated to the post production system 110 such that time synchronization processing is determined by the post production system 110.

The processor system 302, under management of the location and time synchronization management logic 316, is configured to manage the location and/or time synchronization of the acquired information received from the film production information acquisition devices 108. In an exemplary embodiment, the GPS module 312 provides information that defines the location of the reference point 142, which may be internal or which may be external to the film production information management system 104. In some embodiments, the location information from the GPS module 312 is communicated to the post production system 110 such that location (spatial) synchronization processing is determined by the post production system 110.

Embodiments of the film production IAD communication interface 306 are configured to receive acquired information from the film production information acquisition devices 108. An exemplary film production IAD communication interface 306 comprises a wireless transceiver configured to transmit, and/or to receive, the exemplary wireless signals 140. Alternatively, or additionally, the film production IAD communication interface 306 may comprise a suitable wire connection device that is configured to communicatively and physically couple to the exemplary wire connector 138. For example, but not limited to, the exemplary film production IAD communication interface 306 may comprise an interface configured to communicatively connect to a telephone line coupled to a telephony system, a cable coupled to a cable system, a local area network (LAN) coupled to a LAN system, a wide area network (WAN) connection coupled to a WAN system, an Internet connection coupled to the Internet, or the like. Alternatively, or additionally, the film production IAD communication interface 306 may comprise a suitable memory medium connection device that is configured to communicatively and physically couple a portable memory medium to the received film production information 318.

Embodiments of the post production system communication interface 308 are configured to communicate the acquired information to the post production system 110. An exemplary post production system communication interface 308 comprises a wireless transceiver configured to transmit, and/or to receive, wireless signals from a wireless communication system, such as a cellular telephone system, a Wi-fi system, the Internet, or the like. Alternatively, or additionally, the post production system communication interface 308 may comprise a suitable wire connection device that is configured to communicatively and physically couple to a wire connector, such an a telephone line coupled to a telephony system, a cable coupled to a cable system, a local area network (LAN) coupled to a LAN system, a wide area network (WAN) connection coupled to a WAN system, an Internet connection coupled to the Internet, or the like. Alternatively, or additionally, the post production system communication interface 308 may comprise a suitable memory medium connection device that is configured to communicatively and physically couple a portable memory medium to the film production information management system 104.

Each of the different film production information acquisition devices 108 includes an identifier that identifies the film production information acquisition device 108 and/or that identifies its respective film set device 106. When acquired information is received from similar film production information acquisition devices 108, or is received from film production information acquisition devices 108 associated with similar film set devices 106, the film production information management system 104 may sort the received acquired information based on the identifier. For example, information acquired from a plurality of video cameras 120 may be sorted and/or stored together in a suitable database in the received film production information 318 portion of the memory medium 304. Further, like information from the plurality of film set devices 106, such as the type of lens used by a plurality of video cameras 120, may be sorted and/or stored together.

In some embodiments, the film production information management system 104 may be integrated into a film production information acquisition device 108. Thus, if only a single film set device 106 is being used to acquire information, a single integrated device may be used to acquire and then communicate information to the post production system 110. Additionally, the integrated device may be configured to receive acquired information from other film production information acquisition devices 108.

It should be emphasized that the above-described embodiments of the film production information acquisition system 100 are merely possible examples of implementations of the invention. Many variations and modifications may be made to the above-described embodiments. All such modifications and variations are intended to be included herein within the scope of this disclosure and protected by the following claims.

The invention claimed is:

1. A film production information acquisition device, comprising:
   a sensor device configured to sense an operation characteristic of a film set device;
   a film production information management system (IMS) communication interface configured to communicatively couple the film production information acquisition device to a film production information management system; and
   a processor system communicatively coupled to the film production IMS communication interface and the sensor device, and configured to process the sensed operation characteristic of the film set device into information that is communicated to the film production information management system,
   wherein the film production information acquisition device is a stand-alone device that is not an integrated component of its respective film set device, and that is configured to physically couple to its respective film set device.

2. The device of claim 1, further comprising:
   a gyroscope configured to sense a rotational movement of the film production information acquisition device; and
   an accelerometer configured to sense an acceleration movement of the film production information acquisition device,
   wherein an orientation of the film set device is determined based on the detected rotational movement and the detected acceleration movement.

3. The device of claim 1, further comprising:
   a global positioning system (GPS) module communicatively coupled to the processor system, and configured to provide location information to the processor system,
   wherein a location of the film set device is determined based on the location information, and
   wherein the film production information management system is configured to spatially synchronize the location of the film set device with locations of a plurality of other film set devices.

4. The device of claim 1, further comprising:
   a device clock communicatively coupled to the processor system, and configured to provide time information to the processor system,
   wherein a time that the operation characteristic is sensed is determined based on the time information.

5. The device of claim 1, further comprising:
   a range detector communicatively coupled to the processor system, and configured to provide range information corresponding to a distance between the range detector and an object,
   wherein a distance between the object and the film set device is determined based on the range information.

6. The device of claim 1, further comprising:
   a film set device interface configured to communicatively couple the processor system to the film set device,
   wherein supplemental information is received from the film set device, and
   wherein the supplemental information received from the film set device is communicated to the film production information management system.

7. The device of claim 1, wherein the film production IMS communication interface is a wireless transceiver, and wherein the film production IMS communication interface is configured to communicate the operation characteristic to the film production information management system in a wireless signal.

8. The device of claim 7, wherein the wireless transceiver is configured to communicate over a cellular telephone system, and wherein the operation characteristic is communicated to the film production information management system via the cellular telephone system.

9. The device of claim 1, wherein the film production IMS communication interface is configured to communicatively couple to a wire connector, and wherein the film production IMS communication interface is configured to communicate the operation characteristic to the film production information management system via the wire connector.

10. The device of claim 9, wherein the wire connector is coupled to a telephony system, and wherein the film production IMS communication interface is configured to communicate the operation characteristic to the film production information management system via the telephony system.

11. The device of claim 9, wherein the wire connector is coupled to a cable system, and wherein the film production IMS communication interface is configured to communicate the operation characteristic to the film production information management system via the cable system.

12. The device of claim 9, wherein the wire connector is coupled to the Internet, and wherein the film production IMS communication interface is configured to communicate the operation characteristic to the film production information management system via the Internet.

13. The device of claim 1, wherein the film set device include a video camera, a still camera, a stage light, a microphone, a boom, a clapperboard, a weather station, a light meter, and a set prop.

14. A method, comprising:
receiving first device information acquired by a first film production information acquisition device associated with a first film set device, wherein the first acquired device information corresponds to at least one operation characteristic of the first film set device;
communicating the first acquired device information from the first film production information acquisition device to a film production information management system;
receiving second device information acquired by a first second film production information acquisition device associated with a second film set device, wherein the second acquired device information corresponds to at least one operation characteristic of the second film set device; and
communicating the second acquired device information from the second film production information acquisition device to the film production information management system,
wherein the first film set device and the second film set device comprises at least one selected from a group consisting of a stage light, a microphone, a boom, a clapperboard, a weather station, a light meter, and a set prop.

15. The method of claim 14, further comprising:
communicating, from the first film production information acquisition device to the film production information management system, first time information associated with the first acquired device information; and
communicating, from the second film production information acquisition device to the film production information management system, second time information associated with the second acquired device information,
wherein the first time information and the second time information are used to time synchronize the at least one operation characteristic of the first film set device and the at least one operation characteristic of the second film set device.

16. The method of claim 14, further comprising:
communicating first location information associated with the first film device from the first film production information acquisition device to the film production information management system; and
communicating second location information associated with the second film device from the second film production information acquisition device to the film production information management system,
wherein the first location information and the second location information is used to spatially synchronize a location of the first film set device and a location of the second film set device.

17. The method of claim 14, further comprising:
communicating, from the first film production information acquisition device to the film production information management system, rotational movement information detected by a gyroscope associated with the first film device; and
communicating, from the first film production information acquisition device to the film production information management system, acceleration movement information detected by an accelerometer associated with the second film device;
wherein the detected rotational movement and the detected acceleration movement is used at the film production information management system to determine an orientation of the first film set device.

18. A system configured to acquire information from a plurality of film set devices, comprising:
a film production information acquisition device (IAD) interface configured to receive acquired device information from a plurality of film production information acquisition devices,
wherein one film production information acquisition device is associated with one of the plurality of film set devices,
wherein each film production information acquisition device is communicatively coupled to one of the plurality of film set devices, and
wherein the acquired device information comprises information about at least one operation characteristic associated with the film set device, and
wherein each film production information acquisition device includes global positioning system GPS module configured to provide location information pertaining to a location of the respective film set device;
a memory configured to store the acquired device information received from each of the plurality of film production information acquisition devices; and
a processor system communicatively coupled to the film production IAD interface and the memory,
wherein the processor system is configured to process the acquired device information received from the plurality of film production information acquisition devices into information that is incorporated into production information metadata content, and
wherein the processor system is further configured to spatially synchronize the acquired device information received from the plurality of film production information acquisition devices based on the location information received from the GPS modules of each production information acquisition device such that locations of the respective film set devices are spatially referenced with each other.

19. The system of claim 18, further comprising:
a system clock communicatively coupled to the processor system, and configured to provide time information to the processor system,
wherein the processor system is further configured to time synchronize the acquired device information received from the plurality of film production information acquisition devices based on the time information received from the system clock.

20. The system of claim 18, further comprising:
a post production system communication interface communicatively coupled to the processor system and a post production system, and configured to communicate the acquired device information to the post production system.

21. The system of claim 18, wherein each of the film production information acquisition devices are a stand-alone device that is not integrated with its respective film set device, wherein each of the film production information acquisition devices are configured to physically couple to its respective film set device.

22. The system of claim 18, wherein the film set devices include a stage light, a microphone, a boom, a clapperboard, a weather station, a light meter, and a set prop.

* * * * *

UNITED STATES PATENT AND TRADEMARK OFFICE
CERTIFICATE OF CORRECTION

PATENT NO. : 8,457,484 B2
APPLICATION NO. : 13/115886
DATED : June 4, 2013
INVENTOR(S) : Elliot et al.

Page 1 of 1

It is certified that error appears in the above-identified patent and that said Letters Patent is hereby corrected as shown below:

In the Claims:

In Claim 14, at Column 13, Line 46, following the word "a" please delete the word "first"

Signed and Sealed this
Fifteenth Day of October, 2013

Teresa Stanek Rea
*Deputy Director of the United States Patent and Trademark Office*